United States Patent
Zeigmeister et al.

(10) Patent No.: US 10,851,441 B2
(45) Date of Patent: Dec. 1, 2020

(54) PLUG-IN CONNECTOR AND SEMI-FINISHED PRODUCT MADE FROM AN ALUMINUM ALLOY STRIP

(71) Applicant: DIEHL METAL APPLICATIONS GMBH, Berlin (DE)

(72) Inventors: Uwe Zeigmeister, Teltow (DE); Christian Buchholzer, Berlin (DE); Andre Stein, Berlin (DE); Stephan Preuss, Berlin (DE); Martin Wunderlich, Berlin (DE); Sandra Correia, Bains (FR)

(73) Assignee: Diehl Metal Applications GmbH, Berlin (DE)

(*) Notice: Subject to any disclaimer, the term of this patent is extended or adjusted under 35 U.S.C. 154(b) by 519 days.

(21) Appl. No.: 15/857,741

(22) Filed: Dec. 29, 2017

(65) Prior Publication Data
US 2018/0119253 A1  May 3, 2018

Related U.S. Application Data

(63) Continuation of application No. PCT/EP2016/000949, filed on Jun. 9, 2016.

(30) Foreign Application Priority Data

Jun. 29, 2015 (DE) .......... 10 2015 008 302
Jul. 30, 2015 (DE) .......... 10 2015 009 944

(51) Int. Cl.
*B32B 15/01* (2006.01)
*H01H 1/02* (2006.01)
(Continued)

(52) U.S. Cl.
CPC ........... *C22C 21/06* (2013.01); *B32B 15/015* (2013.01); *B32B 15/017* (2013.01); *C22C 9/02* (2013.01);
(Continued)

(58) Field of Classification Search
CPC ........ H01H 1/02; B32B 15/015; B32B 15/017
See application file for complete search history.

(56) References Cited

U.S. PATENT DOCUMENTS 3,489,657 A * 1/1970 Hoskinson ............ B32B 15/017
                                                205/176
4,059,494 A 11/1977 Yanagida et al.
(Continued)

FOREIGN PATENT DOCUMENTS

CN   101752022 A   6/2010
CN   104604036 A   5/2015
(Continued)

OTHER PUBLICATIONS

C.B. Shao, et al.; "Electric Contact Behavior of Cu—Sn Intermetallic Compound Formed in Tin Platings"; 2008; pp. 26-33; IEEE.

*Primary Examiner* — George Wyszomierski
*Assistant Examiner* — Janell C Morillo
(74) *Attorney, Agent, or Firm* — Laurence A. Greenberg; Werner H. Stemer; Ralph E. Locher

(57) ABSTRACT

A plug-in connector and a semi-finished product include a strip of an aluminum alloy and at least one bonding layer of a copper/tin alloy electrolytically applied directly onto the aluminum alloy strip. The bonding layer has a thickness of at most 50 nm. A further metal layer or alloy layer is applied onto the bonding layer.

9 Claims, 1 Drawing Sheet

(51) Int. Cl.
    *C22C 21/06*     (2006.01)
    *C22C 9/02*     (2006.01)
    *C22C 13/00*     (2006.01)
    *C22C 9/04*     (2006.01)
    *B21B 3/00*     (2006.01)

(52) U.S. Cl.
    CPC ................ *C22C 9/04* (2013.01); *C22C 13/00* (2013.01); *H01H 1/02* (2013.01); *B21B 2003/005* (2013.01)

(56) References Cited

U.S. PATENT DOCUMENTS

| | | | |
|---|---|---|---|
| 9,537,243 B2 | 1/2017 | Gaertner | |
| 2009/0104471 A1* | 4/2009 | Wang | C22C 21/00 428/577 |
| 2010/0136366 A1 | 6/2010 | Sasaoka | |
| 2011/0036621 A1 | 2/2011 | Kobayashi et al. | |
| 2015/0236439 A1 | 8/2015 | Okubo et al. | |

FOREIGN PATENT DOCUMENTS

| | | |
|---|---|---|
| DE | 2551947 A1 | 5/1976 |
| DE | 112013004236 T5 | 6/2015 |
| EP | 1284301 A1 | 2/2003 |
| EP | 1788585 A1 | 5/2007 |
| EP | 2182093 A1 | 5/2010 |
| EP | 2799595 A1 | 11/2014 |
| WO | 2010090956 A2 | 8/2010 |

\* cited by examiner

PLUG-IN CONNECTOR AND SEMI-FINISHED PRODUCT MADE FROM AN ALUMINUM ALLOY STRIP

CROSS-REFERENCE TO RELATED APPLICATION

This application is a continuation, under 35 U.S.C. § 120, of copending International Application PCT/EP2016/000949, filed Jun. 9, 2016, which designated the United States; this application also claims the priority, under 35 U.S.C. § 119, of German Patent Applications DE 10 2015 009 944.2, filed Jul. 30, 2015 and DE 10 2015 008 302.3, filed Jun. 29, 2015; the prior applications are herewith incorporated by reference in their entirety.

BACKGROUND OF THE INVENTION

Field of the Invention

The invention relates to a plug-in connector and a semi-finished product made from a strip of an aluminum alloy.

Such an aluminum alloy is known from Dettner/Elze, Handbuch der Galvanotechnik [Handbook of Electroplating], volume I/2, pp. 1033-1047, Carl Hanser Verlag, Munich. The application of a bonding layer of zinc by using a zincate pickling method is described therein.

When the known bonding layer is used, grain boundary corrosion may disadvantageously occur because of a reaction between zinc and aluminum. Furthermore, the zincate pickling method is not suitable for electrolytic strip processes. The coating is therefore difficult, and for example not competitive for plug-in connectors or electrical contact elements compared with copper-based plug-in connectors.

SUMMARY OF THE INVENTION

It is accordingly an object of the invention to provide a plug-in connector made from an aluminum alloy strip, which overcomes the hereinafore-mentioned disadvantages of the heretofore-known devices of this general type.

With the foregoing and other objects in view there is provided, in accordance with the invention, a plug-in connector made from a strip of an aluminum alloy and including at least one bonding layer. The bonding layer is an electrolytically applied copper/tin alloy and is applied directly onto the aluminum alloy. The bonding layer has a thickness of at most 50 nm. A further metal layer or alloy layer is applied onto the bonding layer.

The copper/tin alloy is applied onto the strip by using an electrolytic bath containing copper. The alloy is formed during or after the application of the metals from a sequence of electrolytic strips. According to the invention, a "strip" is intended to mean a workpiece which is a sheet-metal strip, a strip configured in the form of continuous stamp pieces to be subsequently separated, or a semifinished product. The strip according to the invention is, in particular, suitable for coating by an electrolytic strip process.

The electrolytic coating may be "conventional electrolytic coating" in which the workpiece, in particular the strip, is immersed partially or entirely in an electrolytic bath, or it may be an electrolytic strip process.

An "electrolytic strip process" is intended to mean a process in which a strip is unwound from a roll, passed through the electrolytic bath for coating, and subsequently wound up again on a further roll, or processed further in another way. A so-called "roll-to-roll process" is also referred to in this context.

Typically, a native surface oxide of the aluminum alloy is etched away at least partially, in particular fully, by the electrolytic application of the bonding layer.

Expediently, the copper/tin alloy contains $Cu_3Sn$ or $Cu_6Sn_5$. Preferably, the copper/tin alloy is formed either of $Cu_3Sn$ or of $Cu_6Sn_5$ together with unavoidable impurities.

The grain size of the grains of the bonding layer preferably lies in a range of from 10 to 100 nm, in particular from 10 to 30 nm.

Expediently, the aluminum alloy contains at least 80 wt % aluminum, preferably at least 90 wt % aluminum, in particular at least 95 wt % aluminum.

Preferably, the further metal layer or alloy layer is made from at least one metal or alloy selected from the following group: silver, silver/tin, silver/antimony, gold, gold/cobalt, copper, nickel, nickel/phosphorus, nickel/tungsten, indium, lead, palladium/nickel, tin, tin/lead or zinc. One or more further metal layers or alloy layers may be provided. Each of the further metal layers or alloy layers may in particular have a layer thickness of between 50 nm and 15 μm, preferably from 0.5 μm to 9 μm, in particular from 1 μm to 4 μm. Expediently, the at least one further metal layer or alloy layer is also applied by using an electrolytic strip process.

The advantage of coating with a bonding layer made of a copper/tin alloy is that coating by using an electrolytic strip process is possible. A total coating time may thereby be reduced to a fraction of the conventional coating time. Strips having the coating according to the invention can be produced economically. The use of the strips which are coated according to the invention, for example for the production of plug-in connectors, electrical contact elements, in particular as cell connectors in electromobility and the like, is possible.

Other features which are considered as characteristic for the invention are set forth in the appended claims.

Although the invention is illustrated and described herein as embodied in a plug-in connector and a semi-finished product made from an aluminum alloy strip, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
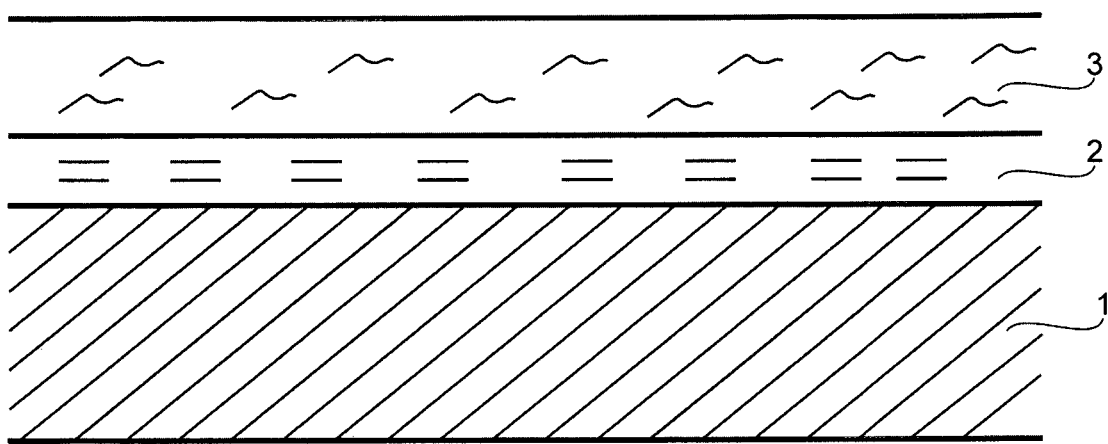
FIG. 1 is a diagrammatic, longitudinal-sectional view of a coated aluminum alloy with a bonding layer and a further metal layer or alloy layer.

Referring now in detail to the figures of the drawings, which reflect only the sequence of the layers but provide no information about the individual layer thicknesses, and first, particularly, to FIG. 1 thereof, there is seen a strip 1 of an aluminum alloy. A bonding layer 2 follows directly on the aluminum alloy strip 1. The bonding layer 2 is formed, for example, of $Cu_3Sn$. A top layer is formed by a further metal layer or alloy layer 3. The further metal layer or alloy layer 3 is, for example, a solderable tin layer.

The formation of the alloy of the bonding layer 2 may take the form of a sequence of electrolytic baths.

Figure 2:
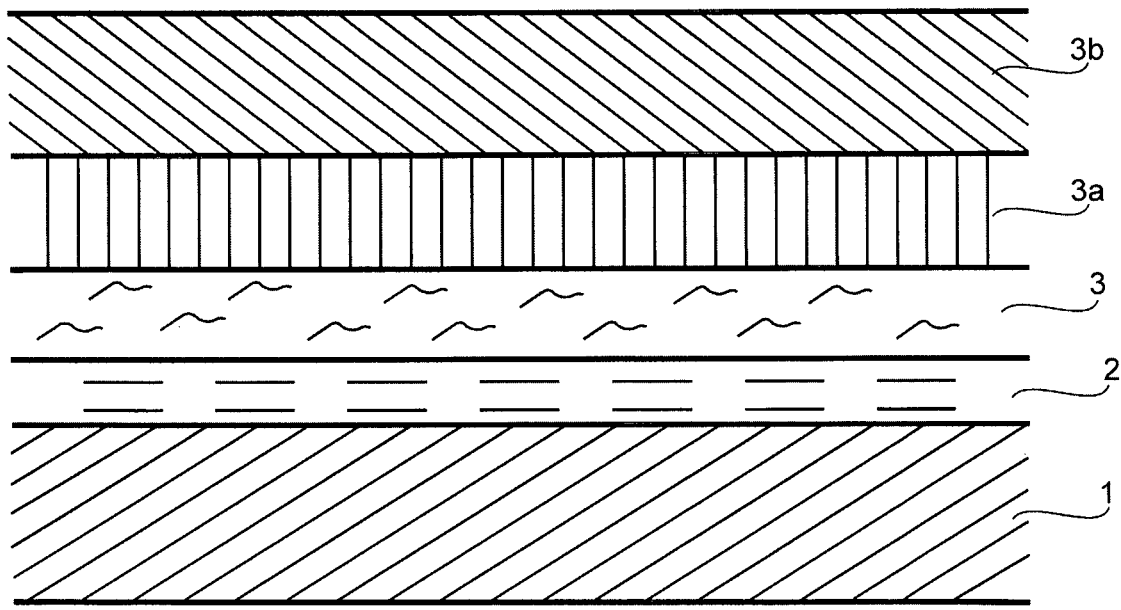
FIG. 2 is a longitudinal-sectional view according to FIG. 1 with further metal layers or alloy layers.

FIG. 2 shows an embodiment according to FIG. 1, in which there are three further metal layers or alloy layers 3, 3a, 3b above the bonding layer 2. The following may be mentioned as an example of the layers: a bonding layer 2 of a copper/tin alloy with a thickness of 30 nm is applied onto a strip with a width of 40 mm and a thickness of 0.5 mm of an aluminum/magnesium alloy having 3 wt % magnesium, a first further metal layer or alloy layer 3 of copper with a thickness of 100 nm is applied thereon, a second further metal layer or alloy layer 3a of nickel with a thickness of 0.5 µm or more is applied thereon, and a third further metal layer or alloy layer 3b of tin with a thickness of 2 µm is applied thereon as the surface layer. The strip which is coated in this way constitutes a semifinished product for further processing. For example, plug-in connectors may be produced therefrom. The third further metal layer or alloy layer 3b is suitable for the production of a solder connection.

In order to produce the coating, the so-called immersion depth method is used for example, in which only that region of the strip which is to be coated is immersed in a coating bath. The other region of the strip remains without coating. The strip passes through a plurality of coating baths for coating with a copper/tin alloy, followed by a bath for coating with copper, then a further bath for coating with nickel, and thereafter a final bath for coating with tin. The residence time and/or the current strength and current density in the respective bath is/are adapted so that a predetermined layer thickness is achieved. Required cleaning steps are added before or between and after the individual baths.

The invention claimed is:

1. A plug-in connector, comprising:
   a strip of an aluminum alloy;
   at least one bonding layer of a copper/tin alloy electrolytically applied directly onto said aluminum alloy strip, said bonding layer having a thickness of at most 50 nm; and
   a further metal layer or alloy layer applied onto said bonding layer.

2. The plug-in connector according to claim 1, wherein said copper/tin alloy contains $Cu_3Sn$ or $Cu_6Sn_5$.

3. The plug-in connector according to claim 1, wherein said copper/tin alloy is formed of $Cu_3Sn$ or of $Cu_6Sn_5$ together with unavoidable impurities.

4. The plug-in connector according to claim 1, wherein said bonding layer has grains with a grain size in a range of from 10 to 30 nm.

5. The plug-in connector according to claim 1, wherein said aluminum alloy strip contains at least 80 wt % aluminum.

6. The plug-in connector according to claim 1, wherein said aluminum alloy strip contains at least 90 wt % aluminum.

7. The plug-in connector according to claim 1, wherein said aluminum alloy strip contains at least 95 wt % aluminum.

8. The plug-in connector according to claim 1, wherein said further metal layer or alloy layer contains a metal or an alloy selected from the group consisting of silver, silver/tin, silver/antimony, gold, gold/cobalt, copper, nickel, nickel/phosphorus, nickel/tungsten, indium, lead, palladium/nickel, tin, tin/lead and zinc.

9. A semi-finished product for producing a plug-in connector, the semi-finished product comprising:
   a strip of an aluminum alloy;
   at least one bonding layer of a copper/tin alloy electrolytically applied directly onto said aluminum alloy strip, said bonding layer having a thickness of at most 50 nm; and
   a further metal layer or alloy layer applied onto said bonding layer.

* * * * *